US006269641B1

(12) United States Patent
Dean

(10) Patent No.: US 6,269,641 B1
(45) Date of Patent: Aug. 7, 2001

(54) STROKE CONTROL TOOL FOR SUBTERRANEAN WELL HYDRAULIC ACTUATOR ASSEMBLY

(75) Inventor: Timothy Lee Dean, Houston, TX (US)

(73) Assignee: Agip Oil US L.L.C., Houston, TX (US)

( * ) Notice: Subject to any disclaimer, the term of this patent is extended or adjusted under 35 U.S.C. 154(b) by 0 days.

(21) Appl. No.: 09/473,599

(22) Filed: Dec. 29, 1999

(51) Int. Cl.[7] ........................... B60T 17/16; F15B 11/08; F01B 25/26

(52) U.S. Cl. .................................. 60/567; 60/591; 91/1; 166/344

(58) Field of Search ........................... 60/567, 581, 591; 166/344; 91/1, 418, 19

(56) References Cited

U.S. PATENT DOCUMENTS

| | | | | |
|---|---|---|---|---|
| 2,032,185 | * | 2/1936 | Sciaky | 60/567 X |
| 2,456,869 | * | 12/1948 | Fowler | 60/581 |
| 2,740,258 | * | 4/1956 | Weber | 60/567 X |
| 2,927,432 | * | 3/1960 | Parry | 60/567 X |
| 3,548,594 | * | 12/1970 | Ceppi | 60/581 X |
| 4,726,190 | * | 2/1988 | Van Marcke | 60/567 |
| 5,617,604 | * | 4/1997 | Erich | 15/104.063 |
| 5,957,207 | | 9/1999 | Schnatzmeyer . | |
| 6,125,938 | * | 10/2000 | Garcia-Soule et al. | 166/344 |

* cited by examiner

*Primary Examiner*—John E. Ryznic
(74) *Attorney, Agent, or Firm*—Fulbright & Jaworski

(57) ABSTRACT

A stroke control tool for controlling the position of a subterranean well hydraulically actuated double acting piston and cylinder actuator assembly. The tool includes hydraulic fluid measuring means positioned adjacent the well and is connected to the actuator by relatively inelastic hydraulic lines so that the volume of fluid communicating between the measuring means and the actuator can accurately be measured for determining the position of the actuator.

15 Claims, 8 Drawing Sheets

STROKE CONTROL TOOL FOR SUBTERRANEAN WELL HYDRAULIC ACTUATOR ASSEMBLY

FIELD OF THE INVENTION

A stroke control tool controlling the position of a subterranean well hydraulically actuated double acting piston and cylinder actuator assembly in which the position of the piston relative to the cylinder is moved by a remotely controlled first and second hydraulic lines. A hydraulic fluid measuring means is connected to one of the lines and is connected to the actuator assembly by an inelastic hydraulic line for accurately measuring and controlling the position of the actuator assembly.

BACKGROUND OF THE INVENTION

A subterranean well hydraulically actuated double acting piston and cylinder actuator assembly may be used for performing various functions in an oil or gas well. Proper operation of the actuator assembly requires that specific quantities of hydraulic fluid be pumped into the assembly for moving the position of the piston relative to the cylinder to a precise position. The hydraulic actuator assembly is remotely controlled by first and second hydraulic lines connected to opposite sides of the assembly. One such actuator is a SCRAMS hydraulically controlled actuator manufactured by, or available from, PES Incorporated of the Woodlands, Texas, and is useful as described in U.S. Pat. No. 5,957,207 for separately controlling two or more producing zones in an oil or gas well. The location of the piston relative to the cylinder must be stroked to a precise position. The SCRAMS tool an electronic position sensor device is used to determine the position of the actuator. Electronic devices often fail in such service due to the severe ambient conditions. It is desirable, therefore, to have an alternative means to determine or control the stroke of the actuator assembly via the hydraulic fluid control lines, outside of the well.

The volume of hydraulic fluid used to actuate or vented from the actuator assembly can in principle be used to determine the position of the piston relative to the cylinder. In use, the actuator assembly is controlled from a remote surface facility through the first and second elastic hydraulic lines, such as thermoplastic lines, which, because of their great length and material, are elastic and therefore the elastic volumetric changes in the actuating line during operation make volumes measured at the surface unreliable.

SUMMARY OF THE INVENTION

The present invention is directed to a stroke control tool for controlling the position of a subterranean well hydraulically actuated double acting piston and cylinder actuator assembly so as to allow the correct positioning of the actuator assembly following a failure of the assembly position sensor.

Still a further object is the provision of means to fix the actuator assembly position following the failure of one of the two hydraulic lines connected to and actuating the assembly.

Still a further object of the present invention is the provision of a stroke control tool comprising a hydraulic fluid measuring means positioned adjacent the well and connected to at least one of the first and second hydraulic lines for receiving hydraulic fluid. The measuring means is connected to the actuating assembly by relatively inelastic hydraulic lines whereby the volume of fluid communicating between the measuring means and the piston and cylinder actuator assembly can be accurately measured by the measuring means for determining the position of the actuator assembly.

Still another object of the present invention is wherein the measuring means includes another piston and cylinder assembly having a predetermined hydraulic fluid volume. In one embodiment the assembly is a plurality of piston and cylinder assemblies connected in parallel and each having a predetermined hydraulic fluid volume. In addition, valve means are connected to each of the plurality of assemblies for allowing the discharge or admission of hydraulic fluid separately to each of the plurality of assemblies. The plurality of assemblies may be connected in only one of the first and second hydraulic lines.

Yet a further object of the present invention is the provision of a lock-in position valve connected in at least one of the first and second hydraulic lines to hydraulically lock the actuator assembly in position in the event of a leak in one of the first and second hydraulic lines.

Yet a further object of the present invention is wherein the stroke control valve in another embodiment includes a piston and cylinder assembly with cross-over valve means between the first and second hydraulic lines for actuating the second assembly a plurality of times for providing a plurality of predetermined outputs to the actuator assembly.

A further object of the present invention is wherein the stroke control tool in another embodiment includes a piston and cylinder assembly having a position indicator for measuring the displacement of hydraulic fluid from the assembly to the actuator assembly.

Still a further object is the provision of a further embodiment of the present invention wherein the measuring means comprises a fluid flow meter for accurately measuring the flow of fluid to and from the actuator assembly for providing a precise position measurement.

Other and further objects, features and advantages will be apparent from the following description of presently preferred embodiments of the invention, given for the purpose of disclosure, and taken in conjunction with the accompanying drawings.

DETAILED DESCRIPTION OF THE PREFERRED EMBODIMENT

Figure 1:
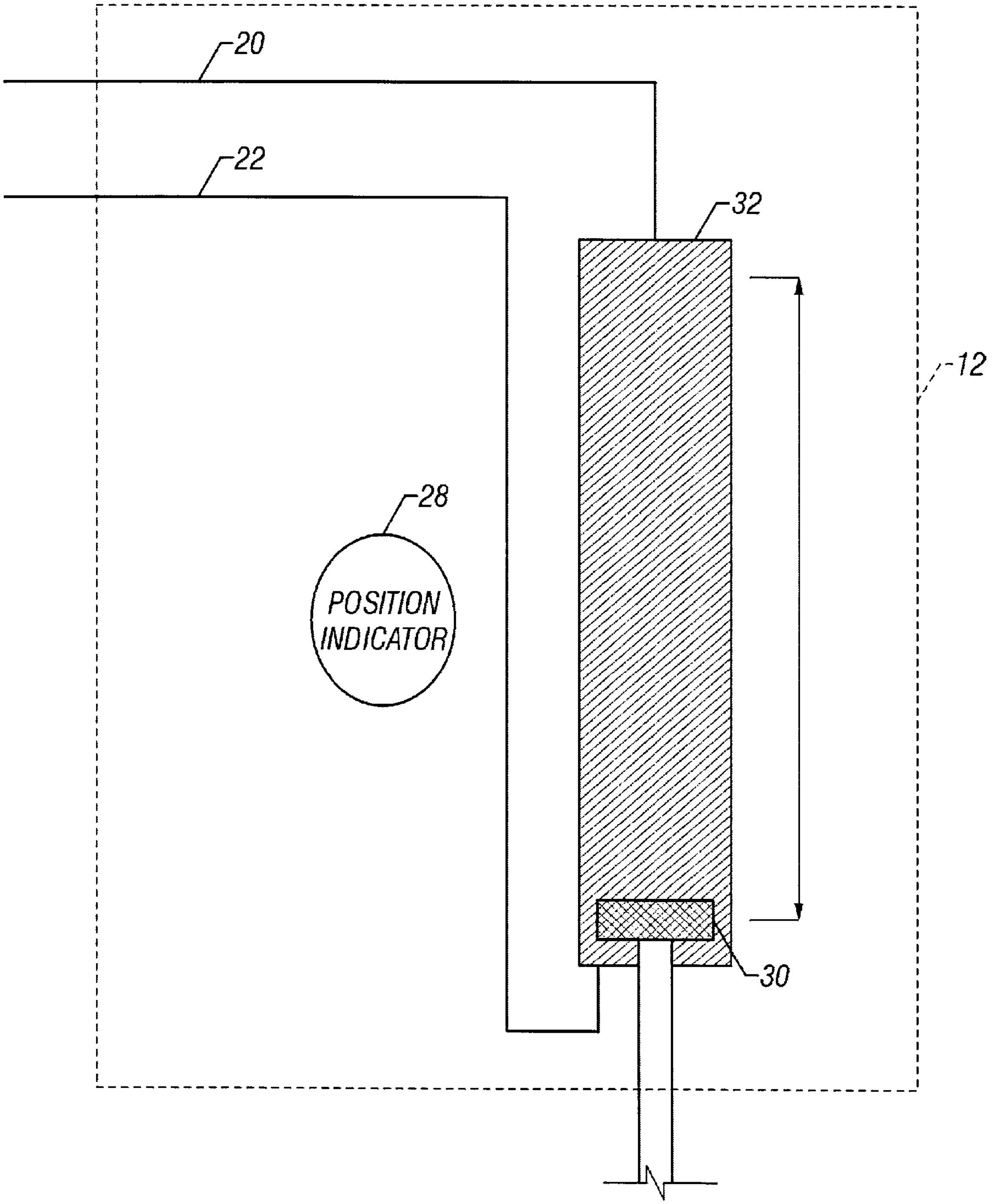
FIG. 1 (Prior Art)
FIG. 1 is an elevational schematic view of a prior art subterranean well hydraulically actuated double acting piston and cylinder assembly actuator assembly.
Figure 2:
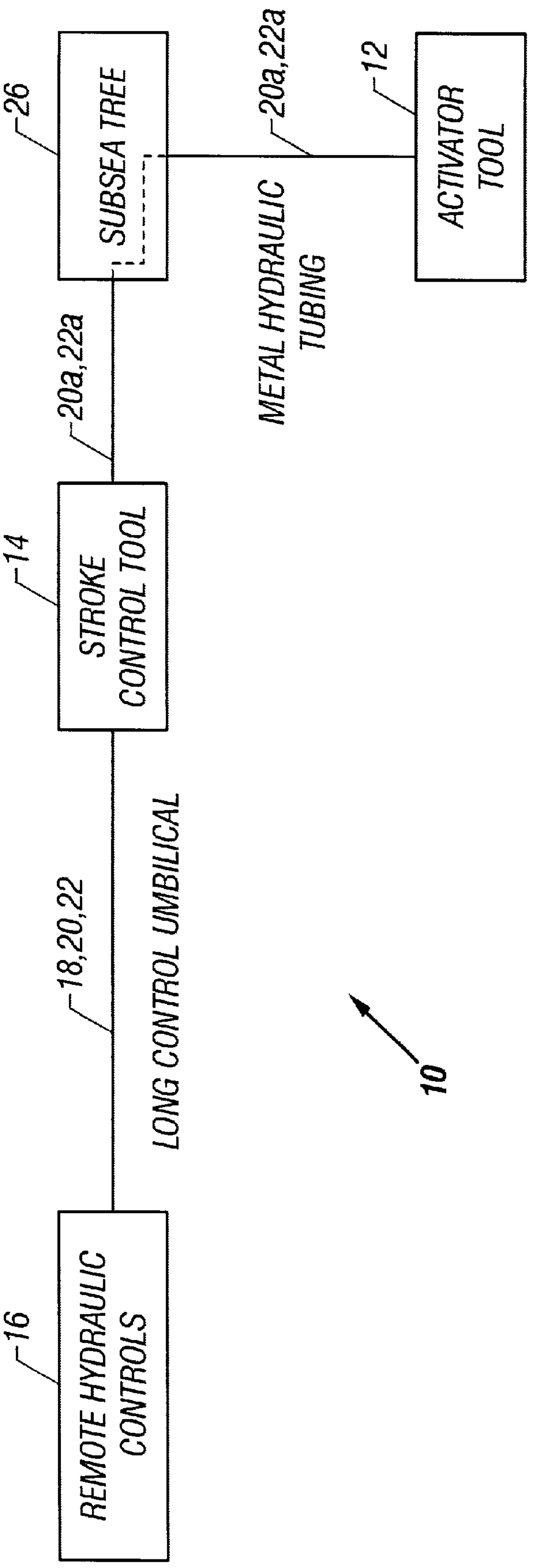
FIG. 2 is a schematic elevational view of a subsea well system utilizing the actuator assembly of FIG. 1 and the stroke control tool of the present invention.

Referring now to FIGS. 1 and 2, one type of subterranean well system is shown in FIG. 2 by the reference numeral 10 which includes a hydraulically actuated double acting piston and cylinder actuator assembly 12 and a stroke control tool 14 of the present invention. The system 10 illustrated in FIG. 2 is a subsea well having remote hydraulic controls 16, such as on an offshore platform (not shown) to which a long control cable 18 is connected which generally includes a first 20 and a second 22 (FIG. 1) hydraulic lines. The cable 18 may be connected to a typical subsea well and wellhead tree 26 and in turn controls the actuator assembly 12. The actuator 12 (FIG. 1) may be of any hydraulic piston 30 and cylinder 32 assembly in which the position of the piston 30 relative to the cylinder 32 is moved by the remotely controlled first and second hydraulic lines 20 and 22 connected to opposite sides of the piston 30. The actuator assembly 12 may control various types of downhole equipment such as valves to control two or more producing zones in an oil or gas well. One particular type of actuator 12 is known as SCRAMS available from PES, Incorporated of the Woodlands, Texas, for use in a well such as disclosed in U.S. Pat. No. 5,957,207. Proper operation of the actuator assembly 12 requires that various quantities of hydraulic fluid be pumped into the assembly 12 to stroke the piston 30 to precise positions. One of the hydraulic control lines 20 strokes the actuator 12 in one direction and a second line 22 strokes the actuator 12 in the reverse direction. A typical local electronic position indicator 28 is included in the actuator 12 to determine the position of the piston 30 relative to the cylinder 32 and transmits the position to the well surface by conventional means. However, the electronic position indicator 28 may fail in service due to the severe ambient conditions.

It is desirable, therefore, to have an alternative means to control the stroke and position of the actuator assembly 12 outside of the well.

In principle, the volume of hydraulic fluid transmitted to or vented to the remote hydraulic controls 16 by the long control lines 18, 20 and 22 can be used to determine the position of the actuator assembly 12. However, the long hydraulic lines 18, 20 and 22 are generally of flexible hose and is generally susceptible to volumetric changes in the lines 18, 20 and 22 during operation of the actuator 12 makes fluid volumes measured at the remote control station 16 unreliable. This prevents the actuator 12 from being positioned correctly if the position indicator 28 is inoperative.

The present invention is directed to a stroke control tool 14 which includes a hydraulic fluid measuring means for controlling the position of the actuator 12. The control tool 14 is positioned adjacent the well 26 and is connected to and communicates hydraulic fluid to the control hydraulic cable 18 including the first and second hydraulic control lines 20 and 22. However, the stroke control tool 14 is connected to the actuator assembly 12 by a relatively inelastic hydraulic lines 20*a* and 22*a* such as metallic tubing through the subsea tree 26. The volumetric uncertainties caused by any expansion of the control lines 20*a* and 22*a* between the stroke control tool 14 and the actuator assembly 12 are insignificant with respect to the operation of the actuator 12.

Figure 3:
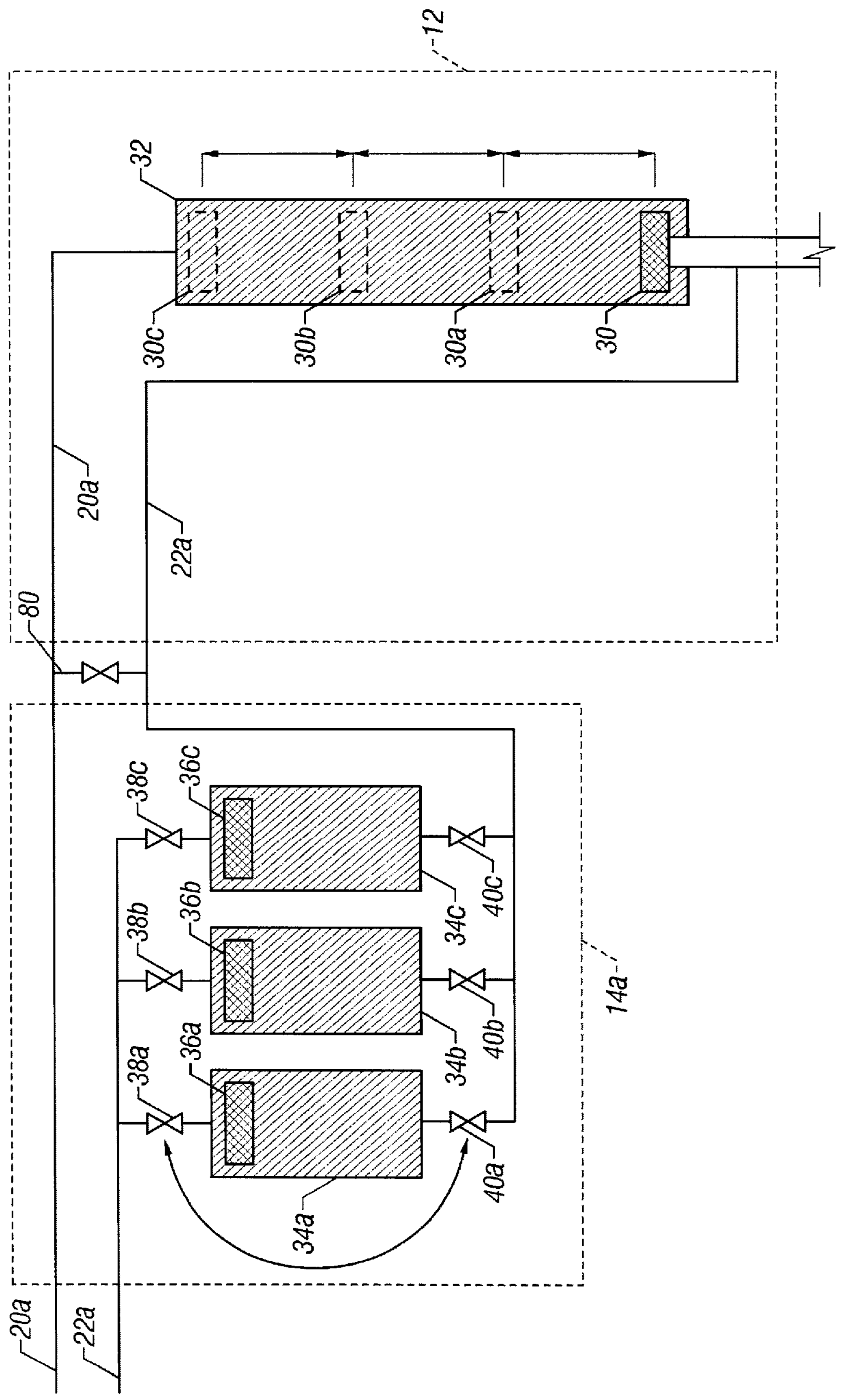
FIG. 3 is a schematic view of one embodiment of the present invention positioning an actuator assembly.

Referring now to FIG. 3, the first embodiment of the present invention discloses a stroke control tool 14*a* which consists of hydraulic fluid measuring means positioned adjacent to the well tree 26 and connected to the actuator assembly 12 by at least one of the first and second inelastic hydraulic lines 20*a* and 22*a* for receiving hydraulic fluid. In this embodiment the measuring means includes at least one piston and cylinder assembly having a predetermined volume of hydraulic fluid, here shown as three piston and cylinder assemblies 34*a*, 34*b* and 34*c*. The predetermined hydraulic fluid volume in each of the assemblies 34*a*, 34*b* and 34*c* may be of any desired volume, here shown as being equal, although differing volumes may be utilized for moving the piston 30 at different positions in the cylinder 32 of the actuator 12. Assuming the piston 36*a* is actuated to displace the fluid in assembly 34*a* into the cylinder 32 the piston 30 would move to the position 30*a*. In addition, if the piston 36*b* is actuated to displace the volume of fluid in the assembly 34*b* into the cylinder 32 the piston 30 would then move to the position 30*b*. In addition, if the piston 36*c* were then moved to expel the fluid in assembly 34*c* into the cylinder 32 the piston 30 would then move to the position 30*c*. Thus, by actuating selectively the assemblies 34*a*, 34*b* and 34*c* discrete volumes of hydraulic fluid can be injected into the actuator assembly 12 to accurately control the position of the piston 30 for precisely determining the operating position of the actuator 12.

The movement of the pistons 36*a*, 36*b* and 36*c* can be controlled by valves 38*a*, 38*b*, 38*c*, respectively, or by valves 40*a*, 40*b* or 40*c*.

In order to reverse the position of the piston 30 from position 30*c*, while the pistons 36*a*, 36*b* and 36*c* are at the other end of the assemblies 34*a*, 34*b* and 34*c*, respectively, fluid is supplied through the hydraulic control line 20*a* and vented from the hydraulic control line 22*a* to move discrete or predetermined volumes of fluid from the cylinder 32 into one or more of the assemblies 34*a*, 34*b* and 34*c*. Again, the movement of the pistons 36*a*, 36*b* and 36*c* are controlled by either the valves 38*a*, 38*b*, 38*c* or valves 40*a*, 40*b* and 40*c*.

All of the valves, in this embodiment or the embodiments hereafter, may be controlled by any conventional method such as a remotely operated vehicle (ROV), a control umbilical in the line 18, or any suitable conventional connection.

While the plurality of piston and cylinder assemblies 34*a*, 34*b* and 34*c* are shown connected in parallel and connected to only one of the hydraulic fluid control lines 22*a*, the parallel array of assemblies could be connected between the hydraulic lines 20*a* and 22*a* if desired. Furthermore, while three assemblies have been shown for purpose of illustration only, any desirable number may be used depending upon the number of discrete positions desired of the piston 30 in the cylinder 32.

Figure 4:
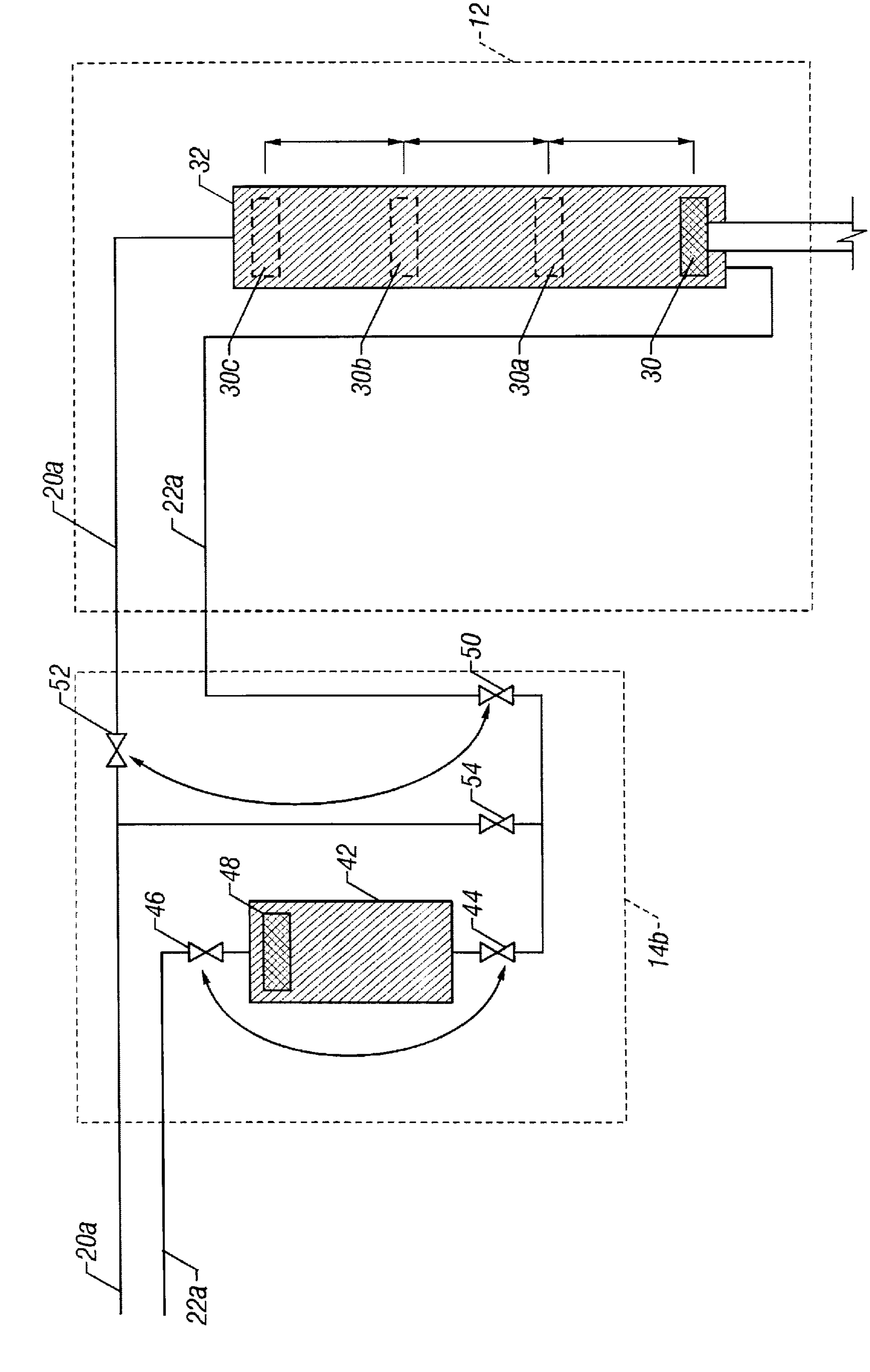
FIG. 4 is a schematic elevational view of another embodiment of the present invention positioning an actuator assembly.

Thus the embodiment of stroke control tool 14*a* of FIG. 3 illustrates the use of a plurality of piston and cylinder assemblies. Referring now to FIG. 4, another embodiment illustrates a stroke control tool 14*b* having a single piston and cylinder assembly 42 which can be actuated for a predetermined hydraulic fluid volume a multiple of times for positioning the piston 30 at predetermined positions in the cylinder 32.

Thus, by transmitting hydraulic fluid through the line 22*a* from the well surface and venting fluid through the line 20*a* from the well surface, the piston 48 in the piston and cylinder assembly 42 fluid may be directed into the cylinder 32 behind the piston 40 to move the piston 30 to position 30*a*. Control of fluid into the piston and cylinder assembly 42 may be accomplished by either or both of the valves 44 and 46. While both of valves 50 and 52 may be utilized to control of fluid to the actuator assembly 12 only one of such valves need to be used.

After the piston and cylinder assembly 42 has been actuated one time to move the piston 30 to the position 30*a*, the valves 50 and 52 are both closed, the valves 44 and 46, if both are used, are both opened and a cross-over valve 54 is opened to allow fluid to be transmitted through line 20*a* through valve 54 and into the piston and cylinder assembly 42 to reposition the piston 48 in the position as shown and to refill the assembly 42 with a predetermined volume of fluid. Thereafter, valves 50 and 52 are opened, valves 44 and 46 are opened, valve 54 is closed and fluid is again transmitted through line 22*a* to again transmit a predetermined fluid into the cylinder 32 to move the piston 30 to position 30*b*.

Thus, the single piston and cylinder assembly 42 illustrated in the embodiment of the tool 14*b* in FIG. 4 may be used a multiple number of times to move the piston 30 to position 30*a*, 30*b* and 30*c*. Again, the position of piston 30 may be reversed from position 30*c* to position 30*b*, 30*a*, or 30 by proper sequencing of the valves and transmitting hydraulic fluid through line 20*a* and venting the fluid through line 22*a*. Thus, assuming the piston at position 30*c* and the piston 48 at the bottom of the assembly 42, valves 50 and 52 are opened, valves 44 and 46 are opened, and valve 54 is closed. Injecting fluid through line 20*a* moves the piston 30 from position 30*c* to 30*b* while moving piston 48 into the position shown in FIG. 4 depositing a predetermined volume of fluid into the assembly 42. Thereafter, valves 50 and 52 are closed, valves 44 and 46 remain open, valve 54 is opened, and the fluid vented into the assembly 42 is expelled through the valve 54 by pressurizing line 22*a* and venting line 20*a*. Similarly, the process may be used multiple times.

The various valves 44, 46, 50, 52 and 54 may be operated by any conventional means. In addition, the piston and cylinder assembly 42 may be directly connected across lines 20*a* and 22*a* instead of being positioned in only one of the lines as shown in FIG. 4.

Figure 5:
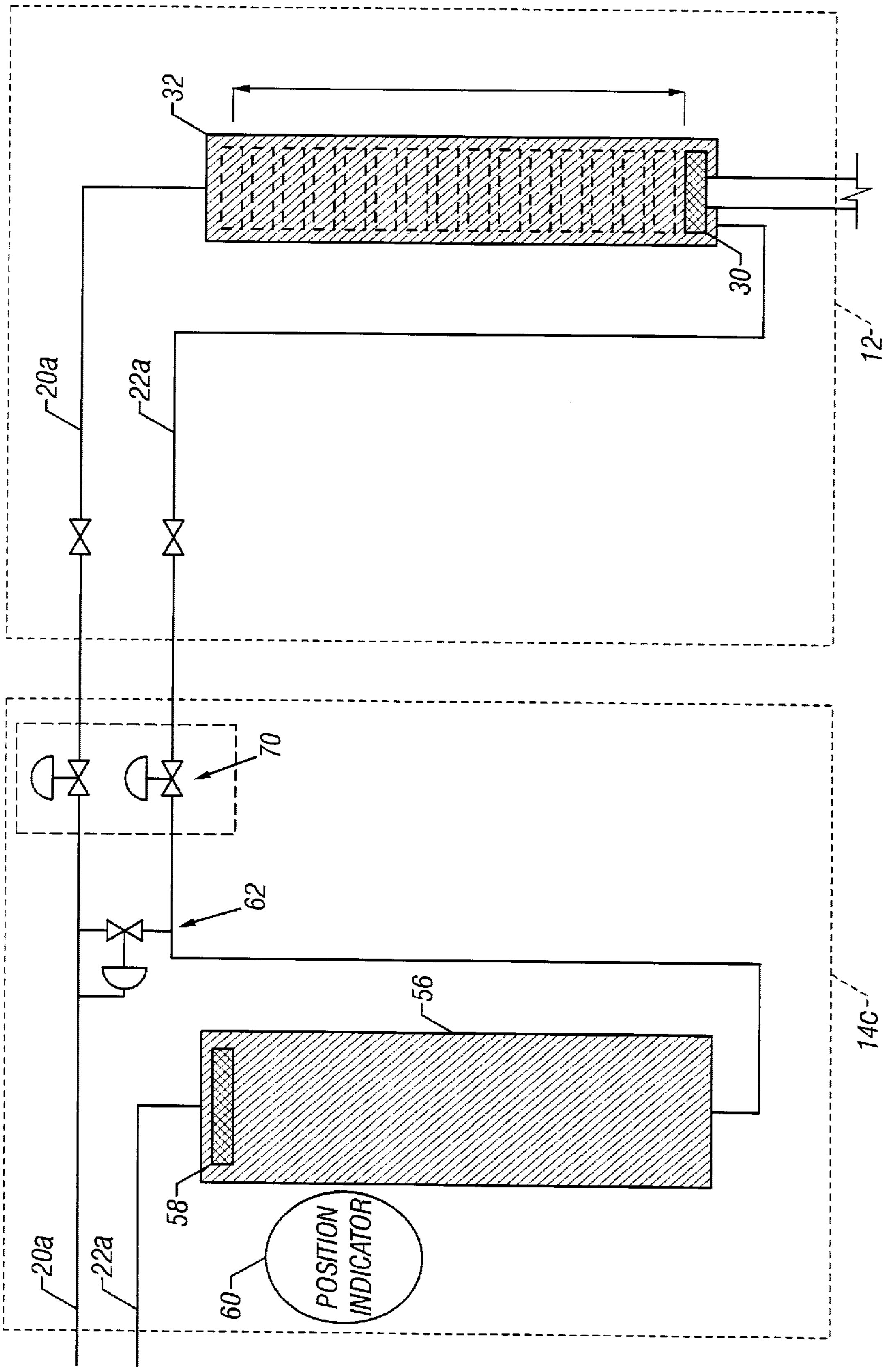
FIG. 5 is a schematic elevational view of still a further embodiment of the present invention positioning an actuator assembly.

Still a further embodiment of the present invention is shown as stroke control 14*c* in FIG. 5 for controlling the position of the actuator assembly 12 through the non-elastic hydraulic lines 20*a* and 22*a*. In the embodiment of FIG. 5, a hydraulic piston and cylinder assembly 56 is provided in which a variable measured fluid volume may be ejected into the cylinder 32 to move the piston 30 to any desired position. Thus, a variable amount of hydraulic fluid volume can be displaced by the piston 58 in the assembly 56 and the variable amount is measured from an electronic or visual position indicator 60. Thus, by moving the stroke control assembly 56 to a predetermined position, to displace a known volume of fluid, as indicated by the position indicator, the location of the piston 30 in the cylinder 32 may be ascertained. Again, the stroke tool 56 may be actuated in reverse, may be installed in line 20*a* instead of line 22*a*, or may be connected across lines 20*a* and 22*a*.

Furthermore, as best seen in FIG. 5, a cross-over valve 62 provides a hydraulic fluid connection between the lines 20*a* and 22*a* to allow adjustment of the fluid volume trapped between the stroke control tool 56 and the actuator assembly 12. This valve may also be utilized in the embodiments of 3 and 4. In particular, the valve 62 is a "normally open type", kept closed by balanced static pressure on both lines 20*a* and 22*a*. It is to be noted that the operating pressure of the actuator assembly 12 is less than the operating pressure of valve 62. In addition, lock-in position valves 70 maybe provided to hydraulically lock the assembly 12 in position in the event of a single leaking downhole hydraulic line. The valves 70 are of the normally closed type, but kept open by balanced static pressure on both lines 20*a* and 22*a*.

Figure 6:
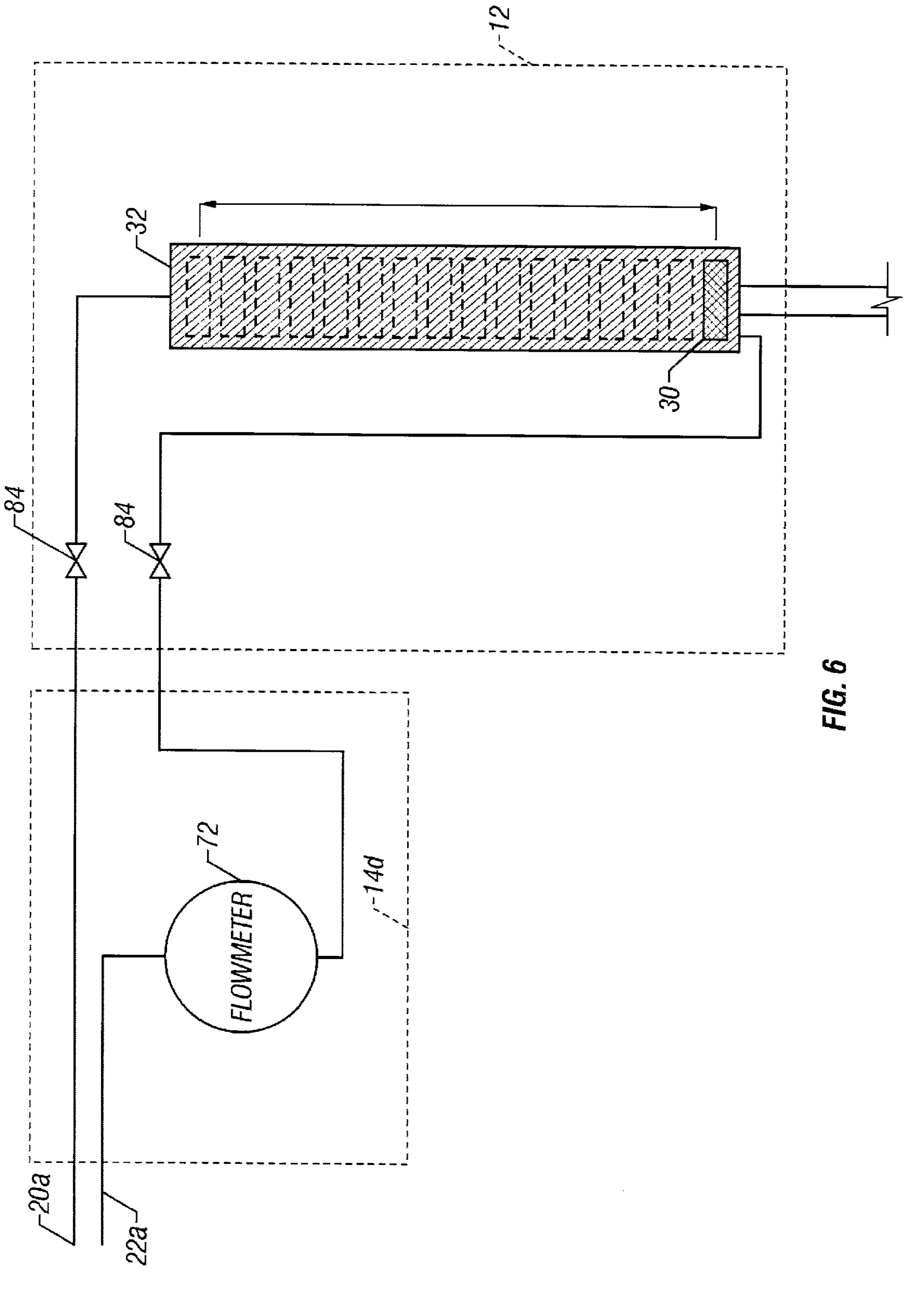
FIG. 6 is a schematic elevational view of yet a further embodiment of the present invention positioning an actuator assembly.

Referring now to FIG. 6, a further embodiment of a stroke control tool 14*d* is illustrated for controlling the position of the hydraulically actuated double acting piston and cylinder actuator assembly 12. In this embodiment, a hydraulic fluid flow meter 72 is positioned in one of the first and second hydraulic control lines 20*a* or 22*a*. Thus, a predetermined variable hydraulic fluid volume can be injected into or vented through the flow meter 72 with the displaced volume displayed remotely electronically or locally visually. Therefore, the specific hydraulic fluid volume required to move the piston 30 to its desired position in the cylinder 32 may be pumped into or out of the assembly 12.

Figure 7:
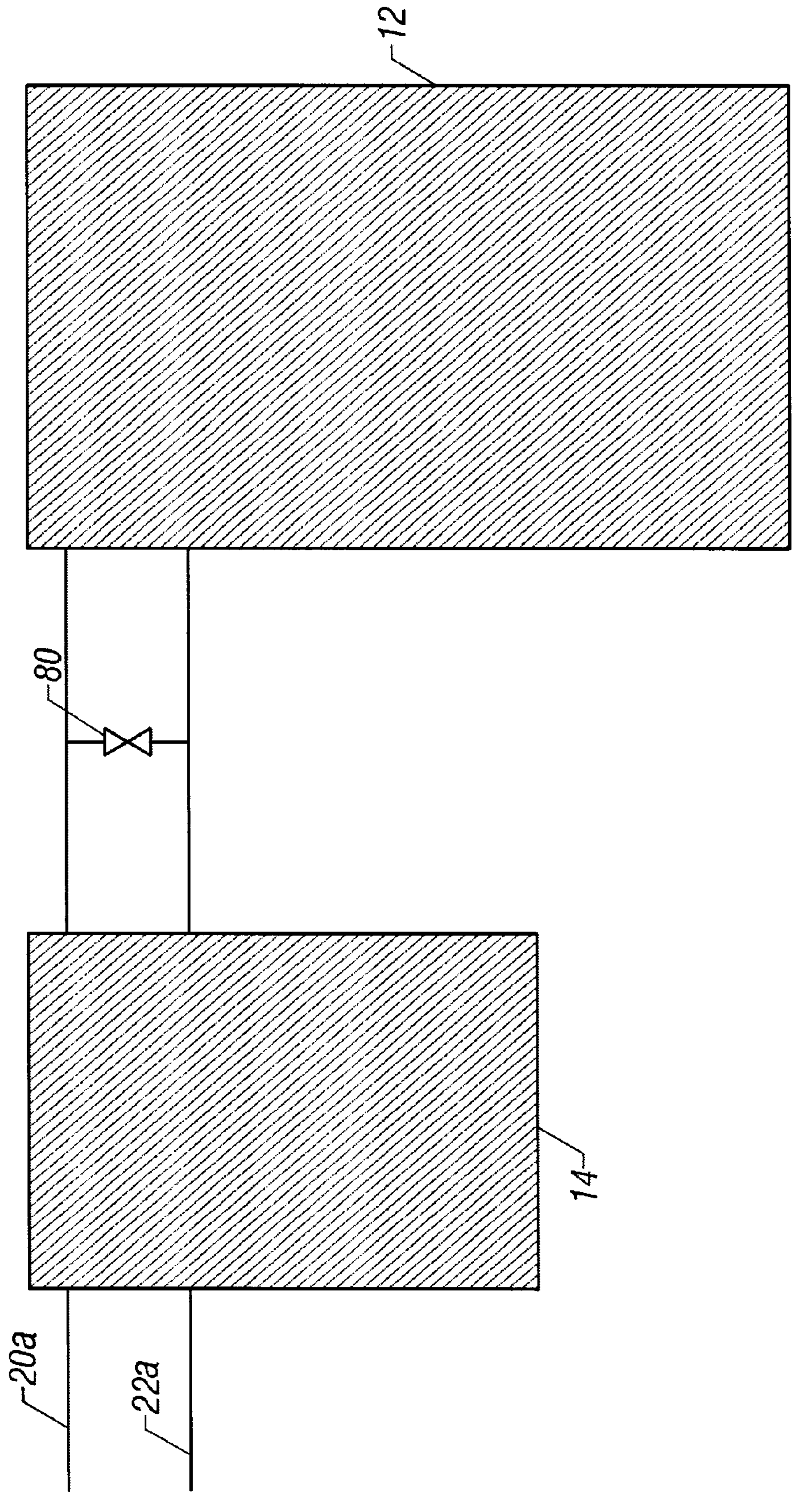
FIG. 7 is a schematic elevational view illustrating a position adjustment valve for use in a combination of the stroke control tool of the present invention and an actuator assembly.

Referring now to FIG. 7, a cross-over valve 80 is connected between lines 20*a* and 22*a* generically between any of the stroke control tools 14 and the actuator assembly 12. The cross-over valve 80 may be utilized in any of the preceding embodiments and its purpose is to allow adjustments to be made for the volume of control fluid between the assembly 12 and the flow control tool 14. And in some cases the cross over valve 80 reverses and actuates pistons in the stroke control tool 14.

Figure 8:
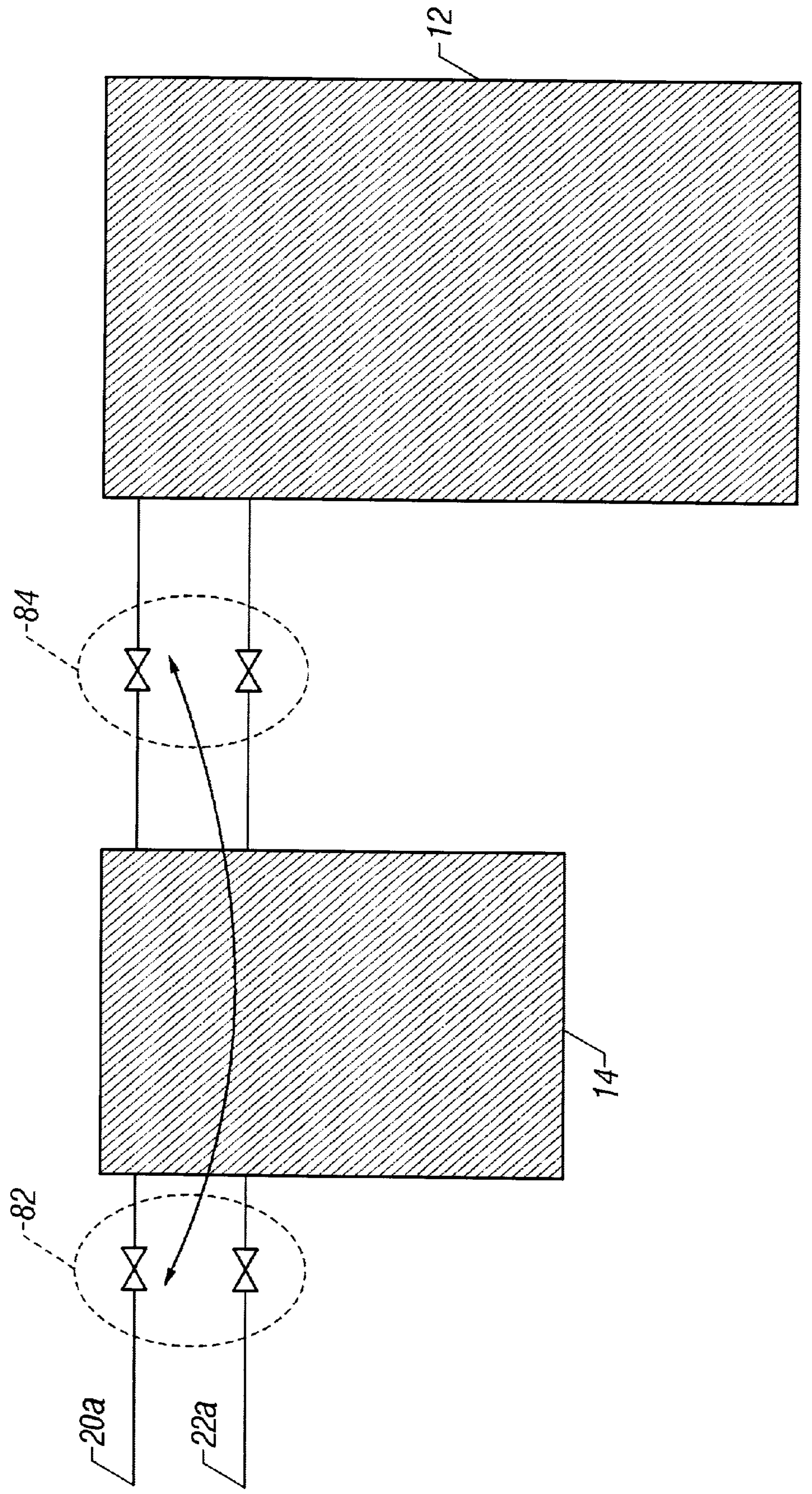
FIG. 8 is an elevational schematic illustrating the provision of a lock-in position valve means for use with the stroke control tool of the present invention and an actuator assembly.

Referring now to FIG. 8, lock-in position valves 82 or 84 (valves 50,52 in FIG. 4 and valves 70 in FIG. 5) may be utilized in any of the embodiments in the lines 20*a* and 22*a*. The purpose of the lock-in position valves are to be used in the event of a leak in one of the two hydraulic control valves 20*a* and 22*a*. Thus, by actuation of the valves 82 or 84 the tool 14 can be configured to the pressure tight line for control of the actuator assembly stroke. The inline valves are used to hydraulically lock the actuator assembly 12 in position.

The present invention, therefore, is well adapted to carry out the objects and attain the ends and advantages mentioned as well as others inherent therein. While presently preferred embodiments of the invention have been given for the purpose of disclosure, numerous changes in the details of construction, and arrangement of parts will be readily apparent to those skilled in the art, and which are encompassed within the spirit of the invention and the scope of the appended claims.

What is claimed is:

1. A stroke control tool for controlling the position of a subterranean well hydraulically actuated double acting piston and cylinder actuator assembly in which the position of the piston relative to the cylinder is moved by remotely controlled first and second hydraulic lines connected to opposite sides of the piston comprising, hydraulic fluid measuring means positioned adjacent the well and connected to at least one of the first and second lines for receiving hydraulic fluid, and said measuring means connected to the piston and cylinder assembly by a relatively inelastic hydraulic line whereby the volume of fluid communicating between the measuring means and the piston and cylinder assembly can be accurately measured by the measuring means for determining the position of the piston and cylinder assembly.

2. The stroke control tool of claim 1 wherein the measuring means comprises, another piston and cylinder assembly having a predetermined hydraulic fluid volume.

3. The stroke control tool of claim 1 including a cross-over valve positioned between the first and second lines.

4. The stroke control tool of claim 2 wherein the assembly is a plurality of piston and cylinder assemblies connected in parallel and each having a predetermined hydraulic fluid volume.

5. The tool of claim 4 including valve means connected to each of the plurality of assemblies for allowing the discharge or admission of hydraulic fluid separately to each of the plurality of assemblies.

6. The tool of claim 4 wherein the plurality of parallel connected assemblies are connected in only one of first and second lines.

7. The tool of claim 4 including a lock-in position valve connected in at least one of the first and second lines.

8. The tool of claim 2 including a lock-in position valve connected in each of the first and second lines.

9. The tool of claim 2 including cross-over valve means between the first and second hydraulic lines for actuating the another assembly a plurality of times for providing a plurality of predetermine outputs to the actuator assembly.

10. The tool of claim 9 wherein the cross-over valve means include a lock-in valve in one of the first and second lines downstream from the another assembly.

11. The tool of claim 2 including a position indicator connected to the another assembly for measuring the displacement of hydraulic fluid from the another assembly to the actuator assembly.

12. The total of claim 11 including a lock-in position valve connected in each of the first and second lines.

13. The tool of claim 11 including cross-over valve means between the first and second hydraulic lines between the subsea assembly and the another assembly for adjusting the hydraulic fluid valve between the subsea assembly and the another assembly.

14. The tool of claim 1 wherein the measuring means comprises a fluid flow meter.

15. The tool of claim 14 including a lock-in position valve in one of the hydraulic lines.

* * * * *